(12) United States Patent
Hwang

(10) Patent No.: US 8,905,724 B2
(45) Date of Patent: Dec. 9, 2014

(54) OIL SUPPLY APPARATUS FOR A VEHICLE

(75) Inventor: Jin Young Hwang, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 481 days.

(21) Appl. No.: 13/316,536

(22) Filed: Dec. 11, 2011

(65) Prior Publication Data
US 2013/0071263 A1    Mar. 21, 2013

(30) Foreign Application Priority Data
Sep. 21, 2011 (KR) .................. 10-2011-0095036

(51) Int. Cl.
| | |
|---|---|
| F04B 49/00 | (2006.01) |
| F16D 41/066 | (2006.01) |
| F16D 41/06 | (2006.01) |
| F16D 47/04 | (2006.01) |
| F04B 17/05 | (2006.01) |

(52) U.S. Cl.
CPC ............ F04B 17/05 (2013.01); F16D 47/04 (2013.01); F14D 41/066 (2013.01)
USPC ....... 417/223; 192/48.92; 192/48.8; 192/48.9

(58) Field of Classification Search
CPC .......... F16D 41/066; F16D 2041/0665; F16D 43/30; F16D 47/04
USPC ................. 417/223; 192/48.92, 48.8, 48.9
See application file for complete search history.

(56) References Cited

U.S. PATENT DOCUMENTS

| | | | | |
|---|---|---|---|---|
| 4,697,991 | A | * | 10/1987 | Tsukahara et al. ............ 417/219 |
| 4,989,704 | A | * | 2/1991 | Morishita et al. ........ 192/45.018 |
| 7,083,397 | B1 | * | 8/2006 | Loprete et al. ............. 417/410.5 |
| 2003/0194334 | A1 | * | 10/2003 | Loprete et al. ............. 417/410.5 |

* cited by examiner

Primary Examiner — Peter J Bertheaud
Assistant Examiner — Dominick L Plakkoottam
(74) Attorney, Agent, or Firm — Morgan, Lewis & Bockius LLP

(57) ABSTRACT

An oil supply apparatus for a vehicle may include an oil pump, a first rotary member provided to the oil pump such that the oil pump may be rotatably operated by the first rotary member, a second rotary member restricted from rotating with respect to the first rotary member in a first direction, the second rotary member being allowed to rotate with respect to the first rotary member in a second direction opposite to the first direction, and a third rotary member allowed to rotate in the first direction with respect to the first rotary member, the third rotary member being restricted from rotating with respect to the first rotary member in the second direction opposite to the first direction, wherein the second rotary member and the third rotary member may be respectively connected to power sources providing drive forces in directions opposite to each other.

13 Claims, 4 Drawing Sheets

OIL SUPPLY APPARATUS FOR A VEHICLE

CROSS-REFERENCE TO RELATED APPLICATION

The present application claims priority to Korean Patent Application No. 10-2011-0095036, filed on Sep. 21, 2011, the entire contents of which is incorporated herein for all purposes by this reference.

BACKGROUND OF THE INVENTION

1. Field of the Invention

The present invention relates generally to an oil supply apparatus for vehicles and, more particularly, to a structure of the apparatus which supplies oil to a transmission in a vehicle having an ISG (Idle Stop & Go) function.

2. Description of Related Art

The function of ISG is an important technique in the development of environmental-friendly and high fuel efficient vehicles that has recently become a great topic of conversation. The ISG is a technique in which during stoppage of a vehicle, the operation of the engine stops to eliminate unnecessary fuel consumption while stopped.

Conventional vehicles having such an ISG function include an oil supply apparatus of FIG. 1 that supplies oil to a transmission. In detail, an engine 500 and an oscillator 502 are connected to a drive unit of a mechanical oil pump 504. While the engine 500 is being operated, the mechanical oil pump 504 pumps oil to supply it to a transmission 506. In an ISG state in which the engine 500 is stationary, a motor 508 is operated so that an electric oil pump 510 pumps oil to supply it to the transmission 506. Thereby, during the stoppage of the vehicle, standby oil pressure in the transmission 506 can be maintained so that when the vehicle restarts, the transmission 506 can be smoothly operated.

However, the conventional oil supply apparatus having the above-mentioned construction needs two oil pumps including the mechanical oil pump 504 and the electric oil pump 510 that have the same function of pumping oil to supply it to the transmission 506. Further, separate oil passages and a check valve 512 for backflow prevention, etc., are also required. Therefore, the number of parts increases, and the structure of the apparatus is complex.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an oil supply apparatus which is configured such that oil is smoothly and reliably supplied to a transmission of a vehicle having an ISG function despite a simple structure with a reduced number of parts, thus reducing the production cost of the vehicle.

In an aspect of the present invention, an oil supply apparatus for a vehicle, may include an oil pump, a first rotary member provided to the oil pump such that the oil pump is rotatably operated by the first rotary member, a second rotary member restricted from rotating with respect to the first rotary member in a first direction, the second rotary member being allowed to rotate with respect to the first rotary member in a second direction opposite to the first direction, and a third rotary member allowed to rotate in the first direction with respect to the first rotary member, the third rotary member being restricted from rotating with respect to the first rotary member in the second direction opposite to the first direction, wherein the second rotary member and the third rotary member are respectively connected to power sources providing drive forces in directions opposite to each other.

A first one-way clutch is provided between the first rotary member and the second rotary member, and a second one-way clutch is provided between the first rotary member and the third rotary member.

The first rotary member, the second rotary member and the third rotary member coaxially overlap each other on the same imaginary plane.

The second rotary member is coaxially disposed inside the first rotary member, and the third rotary member is coaxially disposed around the first rotary member.

At least one roller and at least one wedge-shaped depressed structure having a slanted surface are provided between the first rotary member and the second rotary member to form the first one-way clutch, and at least one roller and at least one wedge-shaped depressed structure having a slanted surface are provided between the first rotary member and the third rotary member to form the second one-way clutch, each of the slanted surfaces guiding variation in a radial displacement of the corresponding roller in response to a circumferential displacement of each roller.

The slanted surfaces of the first one-way clutch and the second one-way clutch are inclined in opposite direction along a circumferential direction.

A spring is provided in the slanted surfaces of the first one-way clutch and the second one-way clutch and biases the rollers in the first one-way clutch and the second one-way clutch towards a wide portion of the slanted surfaces.

The power sources may include an engine and an electric motor.

In another aspect of the present invention, a double one-way clutch may include a first rotary member provided so as to be rotatable, a second rotary member restricted from rotating with respect to the first rotary member in a first direction, the second rotary member being allowed to rotate with respect to the first rotary member in a second direction opposite to the first direction, and a third rotary member allowed to rotate in the first direction with respect to the first rotary member, the third rotary member being restricted from rotating with respect to the first rotary member in the second direction opposite to the first direction, wherein at least one among the first rotary member, the second rotary member and the third rotary member receives a rotating force, and at least another one outputs a rotating force, wherein the first rotary member, the second rotary member and the third rotary member coaxially overlap each other on the same imaginary plane.

At least one roller and at least one wedge-shaped depressed structure having a slanted surface are provided between the first rotary member and the second rotary member, and at least one roller and at least one wedge-shaped depressed structure having a slanted surface are provided between the first rotary member and the third rotary member, each of the slanted surfaces guiding variation in a radial displacement of the corresponding roller in response to a circumferential displacement of the roller, wherein the slanted surfaces of the first one-way clutch and the second one-way clutch are inclined in opposite direction along a circumferential direction, and wherein a spring is provided in the slanted surfaces of the first one-way clutch and the second one-way clutch and biases the rollers in the first one-way clutch and the second one-way clutch towards a wide portion of the slanted surfaces.

The methods and apparatuses of the present invention may have other features and advantages which will be apparent from or are set forth in more detail in the accompanying drawings, which are incorporated herein, and the following Detailed Description, which together serve to explain certain principles of the present invention.

Figure 1:
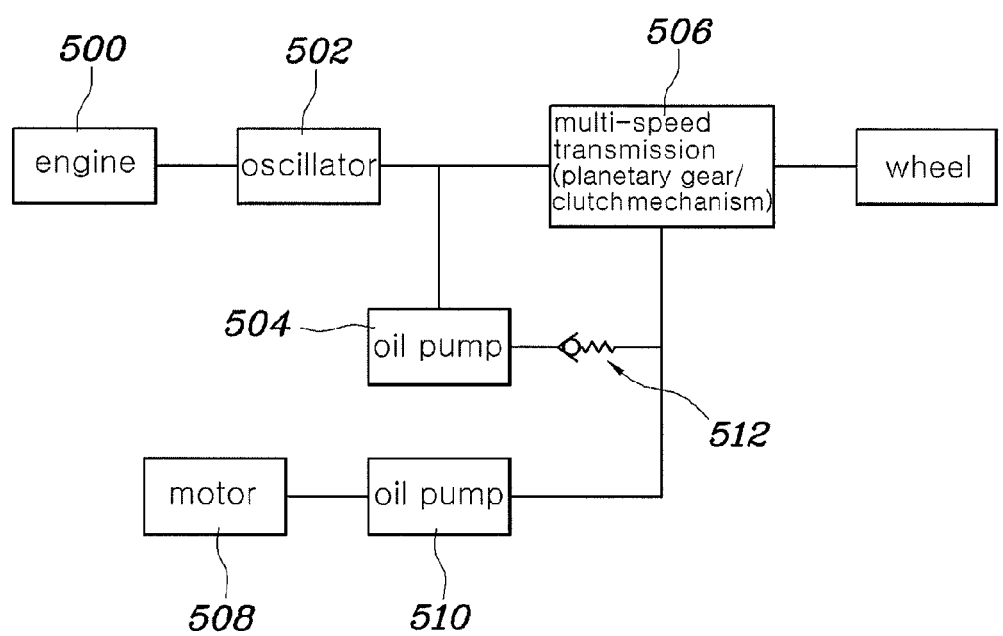
FIG. 1 is a block diagram illustrating an oil supply structure of a transmission according to a conventional technique.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Figure 2:
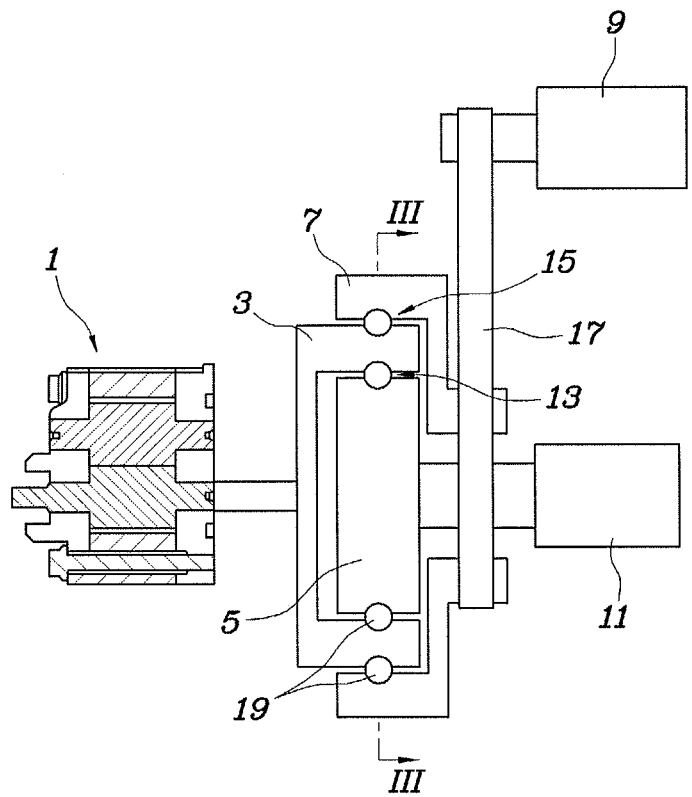
FIG. 2 is a view showing an oil supply apparatus for a vehicle, according to an exemplary embodiment of the present invention.
Figure 3:
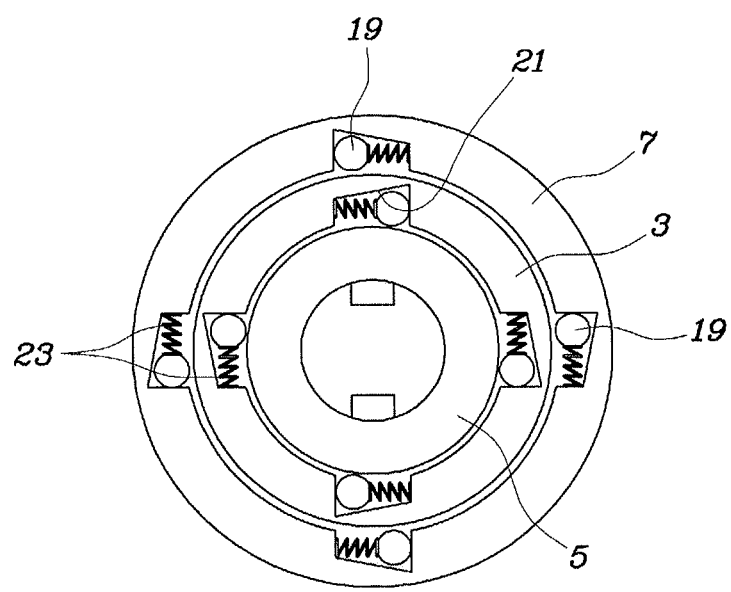
FIG. 3 is a sectional view taken along line III-III of FIG. 2.

Referring to FIGS. 2 and 3, an oil supply apparatus for a vehicle according to an exemplary embodiment of the present invention includes an oil pump 1, a first rotary member 3, a second rotary member 5 and a third rotary member 7. The first rotary member 3 is provided so as to be rotatable so that the oil pump 1 is operated by the first rotary member 3. The second rotary member 5 is restricted from rotating in a first direction with respect to the first rotary member 3 and is allowed to rotate with respect to the first rotary member 3 in a second direction opposite to the first direction. The third rotary member 7 is allowed to rotate in the first direction with respect to the first rotary member 3 and is restricted from rotating with respect to the first rotary member 3 in the second direction opposite to the first direction. The second rotary member 5 and the third rotary member 7 are respectively connected to power sources which provide drive forces in directions opposite to each other.

In the exemplary embodiment, the power sources include an engine 9 and an electric motor 11. The second rotary member 5 is connected to the electric motor 11. The third rotary member 7 is connected to the engine 9. The first rotary member 3 is connected to the oil pump 1. Thus, when the second rotary member 5 is operated by the drive force of the electric motor 11, the first rotary member 3 is operated along with the second rotary member 5. Thereby, the oil pump 1 is operated. When the third rotary member 7 is operated by the drive force of the engine 9, the first rotary member 3 is operated along with the third rotary member 7 so that the oil pump 1 is operated.

Of course, during the rotation of the third rotary member 7, the second rotary member 5 does not rotate. During the rotation of the second rotary member 5, the third rotary member 7 does not rotate.

For this, a first one-way clutch 13 is provided between the first rotary member 3 and the second rotary member 5. A second one-way clutch 15 is provided between the first rotary member 3 and the third rotary member 7. The first and second one-way clutches 13 and 15 allow opposite-directional rotating forces to be transmitted but do not allow the rotating forces to be transmitted in the reverse direction.

In the exemplary embodiment, the first rotary member 3, the second rotary member 5 and the third rotary member 7 coaxially overlap each other on the same plane.

In detail, the second rotary member 5 is coaxially disposed inside the first rotary member 3. The third rotary member 7 is coaxially disposed around the first rotary member 3.

As shown in FIG. 2, the first rotary member 3 is connected at the left-hand side thereof to the oil pump 1, and the second rotary member 5 is connected at the right-hand side thereof to the electric motor 11. The third rotary member 7 is connected to the engine 9 by a belt 17, a chain or the like.

Alternatively, the third rotary member 7 may be connected to the engine 9 by gears, in place of the belt 17 or the chain.

Substantially, the first rotary member 3, the second rotary member 5 and the third rotary member 7 forms a double one-way clutch structure. At least one roller 19 and at least one wedge-shaped depressed structure having a slanted surface 21 are provided between the first rotary member 3 and the second rotary member 5. In addition, at least one roller 19 and at least one wedge-shaped depressed structure having a slanted surface 21 are provided between the first rotary member 3 and the third rotary member 7. Each slanted surface 21 guides variation in a radial displacement of the corresponding roller 19 in response to a circumferential displacement of the roller 19.

Furthermore, a spring 23 is provided to elastically support each spring 23 so that the roller 19 is always biased by the spring 23 towards a wide portion of a space defined by the slanted surface 21. Thereby, the transmission of power between the two rotary members that are disposed on opposite sides of each roller 19 can be more reliably selectively interrupted.

If a rotary member that is in contact with the circumferential outer surface of the roller 19 rotates in a direction in which the roller 19 moves towards a relatively narrow portion of the space defined by the slanted surface 21, the rotary member pushes the roller 19 into the narrow portion of the space, so that the outer rotary member that has the wedge-shaped space also rotates along with the inner rotary member that pushes the roller 19.

The operation of the present invention having the above-mentioned construction will be explained below with reference to FIGS. 4 and 5.

Figure 4:
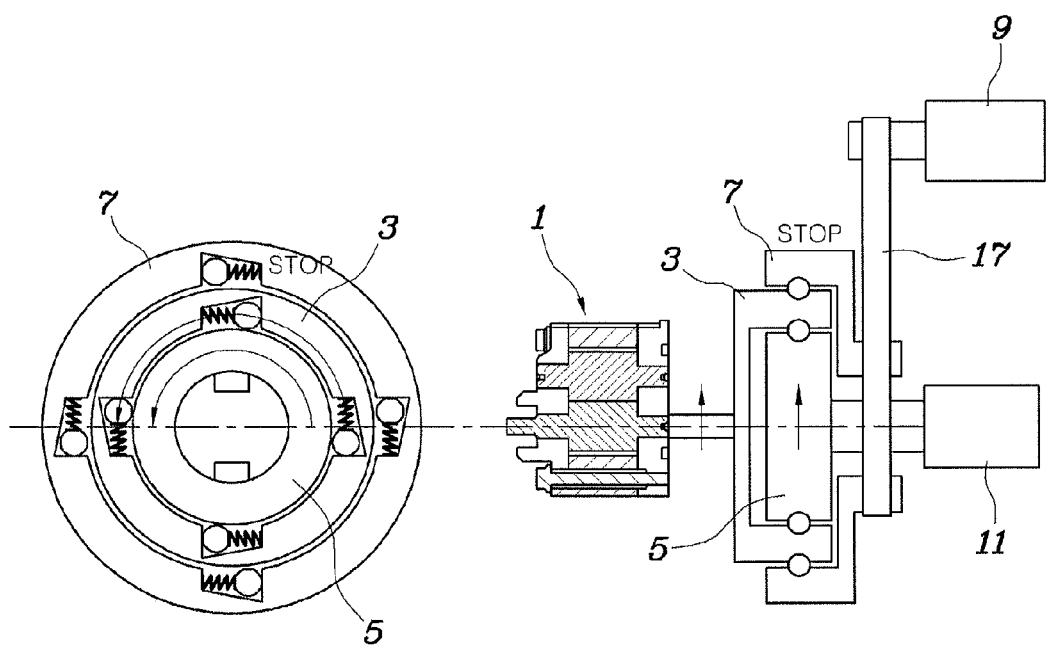
FIG. 4 is a view illustrating a state in which an engine stops and an oil pump is operated by an electric motor according to an exemplary embodiment of the present invention.

FIG. 4 illustrates the case where the engine 9 is in a stationary state, in other words, it shows an ISG mode, wherein the second rotary member 5 is rotated by the drive force of the electric motor 11 so that the first rotary member 3 rotates to operate the oil pump 1.

In this case, the engine 9 is in the stationary state. The third rotary member 7 which is mechanically connected to the engine 9 is maintained in the stationary state along with the engine 9.

Figure 5:
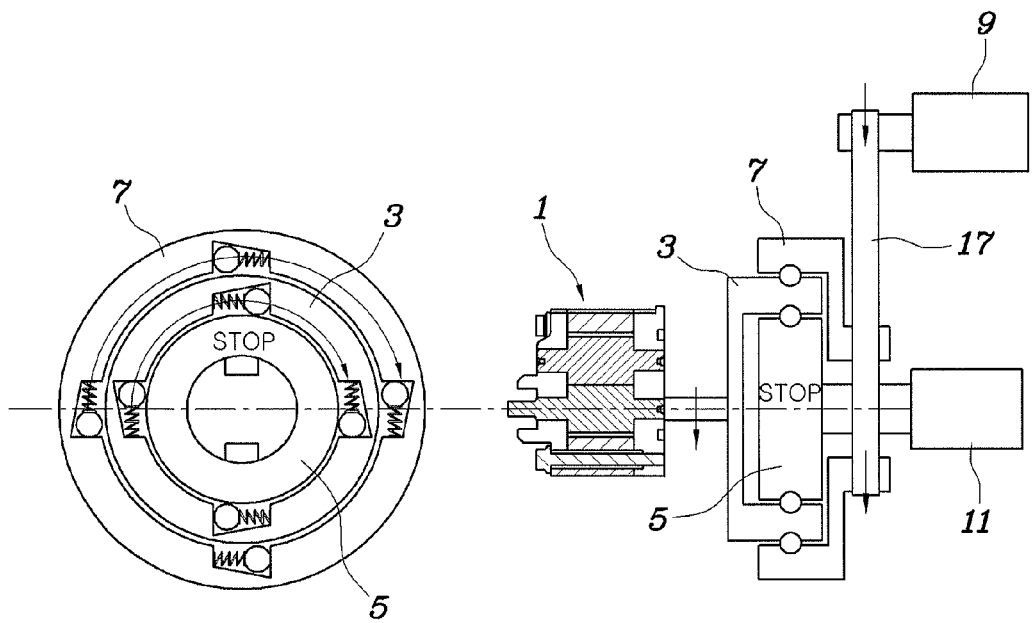
FIG. 5 is a view illustrating a state in which the electric motor stops and the oil pump is operated by the engine according to an exemplary embodiment of the present invention.

FIG. 5 illustrates the case where the engine 9 is being operated. In this case, the third rotary member 7 and the first rotary member 3 rotate together so that the oil pump 1 connected to the first rotary member 3 is operated to pump oil. The second rotary member 5 and the electric motor 11 are stationary.

Of course, the rotation of direction of the engine 9 is opposite that of the electric motor 11. Because such bidirectional drive forces must always be able to operate the oil pump 1, a bidirectional oil pump must be used as the oil pump 1.

In the oil supply apparatus of the present invention, when the engine 9 is being operated, the oil pump 1 is operated by the engine 9, whereas when the engine 9 is stationary, the oil pump 1 is operated by the electric motor 11. Not only when the oil pump 1 is operated by the engine 9 but also when it is operated by the electric motor 11, there is neither interference therebetween nor unnecessary power transmission, thus minimizing power loss, and contributing to enhancing the fuel efficiency. In addition, the present invention can reduce the number of elements, thereby making the vehicle more compact, reducing the weight thereof, and simplifying the structure thereof.

For convenience in explanation and accurate definition in the appended claims, the terms "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An oil supply apparatus for a vehicle, comprising:
   an oil pump;
   a first rotary member provided to the oil pump such that the oil pump is rotatably operated by the first rotary member;
   a second rotary member restricted from rotating with respect to the first rotary member in a first direction, the second rotary member being allowed to rotate with respect to the first rotary member in a second direction opposite to the first direction; and
   a third rotary member allowed to rotate in the first direction with respect to the first rotary member, the third rotary member being restricted from rotating with respect to the first rotary member in the second direction opposite to the first direction,
   wherein the second rotary member and the third rotary member are respectively connected to power sources providing drive forces in directions opposite to each other.

2. The oil supply apparatus as set forth in claim 1, wherein:
   a first one-way clutch is provided between the first rotary member and the second rotary member, and
   a second one-way clutch is provided between the first rotary member and the third rotary member.

3. The oil supply apparatus as set forth in claim 2, wherein the first rotary member, the second rotary member and the third rotary member coaxially overlap each other on the same imaginary plane.

4. The oil supply apparatus as set forth in claim 2, wherein:
   the second rotary member is coaxially disposed inside the first rotary member, and
   the third rotary member is coaxially disposed around the first rotary member.

5. The oil supply apparatus as set forth in claim 2, wherein:
   at least one roller and at least one wedge-shaped depressed structure having a slanted surface are provided between the first rotary member and the second rotary member to form the first one-way clutch, and
   at least one roller and at least one wedge-shaped depressed structure having a slanted surface are provided between the first rotary member and the third rotary member to form the second one-way clutch, each of the slanted surfaces guiding variation in a radial displacement of the corresponding roller in response to a circumferential displacement of each roller.

6. The oil supply apparatus as set forth in claim 5, wherein the slanted surfaces of the first one-way clutch and the second one-way clutch are inclined in opposite direction along a circumferential direction.

7. The oil supply apparatus as set forth in claim 5, wherein a spring is provided in the slanted surfaces of the first one-way clutch and the second one-way clutch and biases the rollers in the first one-way clutch and the second one-way clutch towards a wide portion of the slanted surfaces.

8. The oil supply apparatus as set forth in claim 1, wherein the power sources include an engine and an electric motor.

9. A double one-way clutch, comprising: a first rotary member provided so as to be rotatable; a second rotary member restricted from rotating with respect to the first rotary member in a first direction, the second rotary member being allowed to rotate with respect to the first rotary member in a second direction opposite to the first direction; and a third rotary member allowed to rotate in the first direction with respect to the first rotary member, the third rotary member being restricted from rotating with respect to the first rotary member in the second direction opposite to the first direction, wherein the second rotary member and the third rotary member each receive a respective rotating force from different power sources and the first rotary member correspondingly outputs a rotary force.

10. The double one-way clutch as set forth in claim 9, wherein the first rotary member, the second rotary member and the third rotary member coaxially overlap each other on the same imaginary plane.

11. The double one-way clutch as set forth in claim 10, wherein at least one roller and at least one wedge-shaped depressed structure having a slanted surface are provided between the first rotary member and the second rotary member, and at least one roller and at least one wedge-shaped depressed structure having a slanted surface are provided between the first rotary member and the third rotary member, each of the slanted surfaces guiding variation in a radial displacement of the corresponding roller in response to a circumferential displacement of the roller.

12. The oil supply apparatus as set forth in claim 11, wherein the slanted surfaces of the first one-way clutch and the second one-way clutch are inclined in opposite direction along a circumferential direction.

13. The oil supply apparatus as set forth in claim 11, wherein a spring is provided in the slanted surfaces of the first one-way clutch and the second one-way clutch and biases the rollers in the first one-way clutch and the second one-way clutch towards a wide portion of the slanted surfaces.

* * * * *